Sept. 11, 1962   D. E. TRUMBULL ET AL   3,053,457
DEMAND MIXING AND DISPENSING GUN FOR MULTI-COMPONENT MATERIALS
Filed Aug. 18, 1960   7 Sheets-Sheet 5
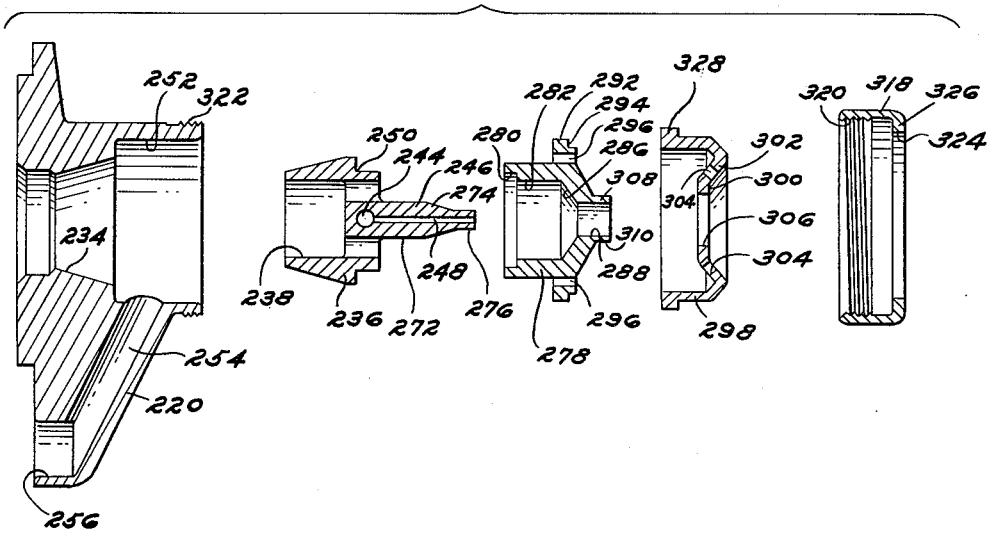
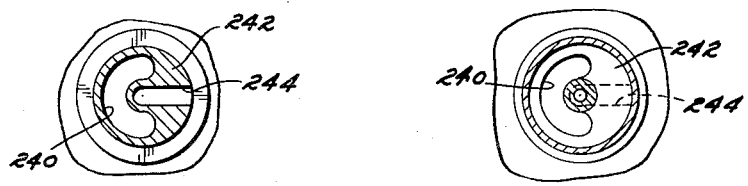
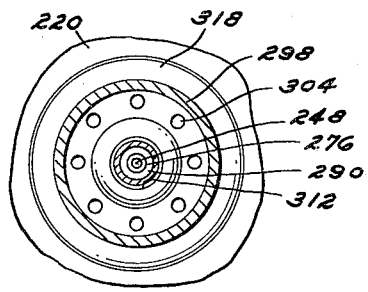
INVENTORS
DONALD E. TRUMBULL
ARTHUR J. DEVINE
BY
Burton & Parker
ATTORNEYS

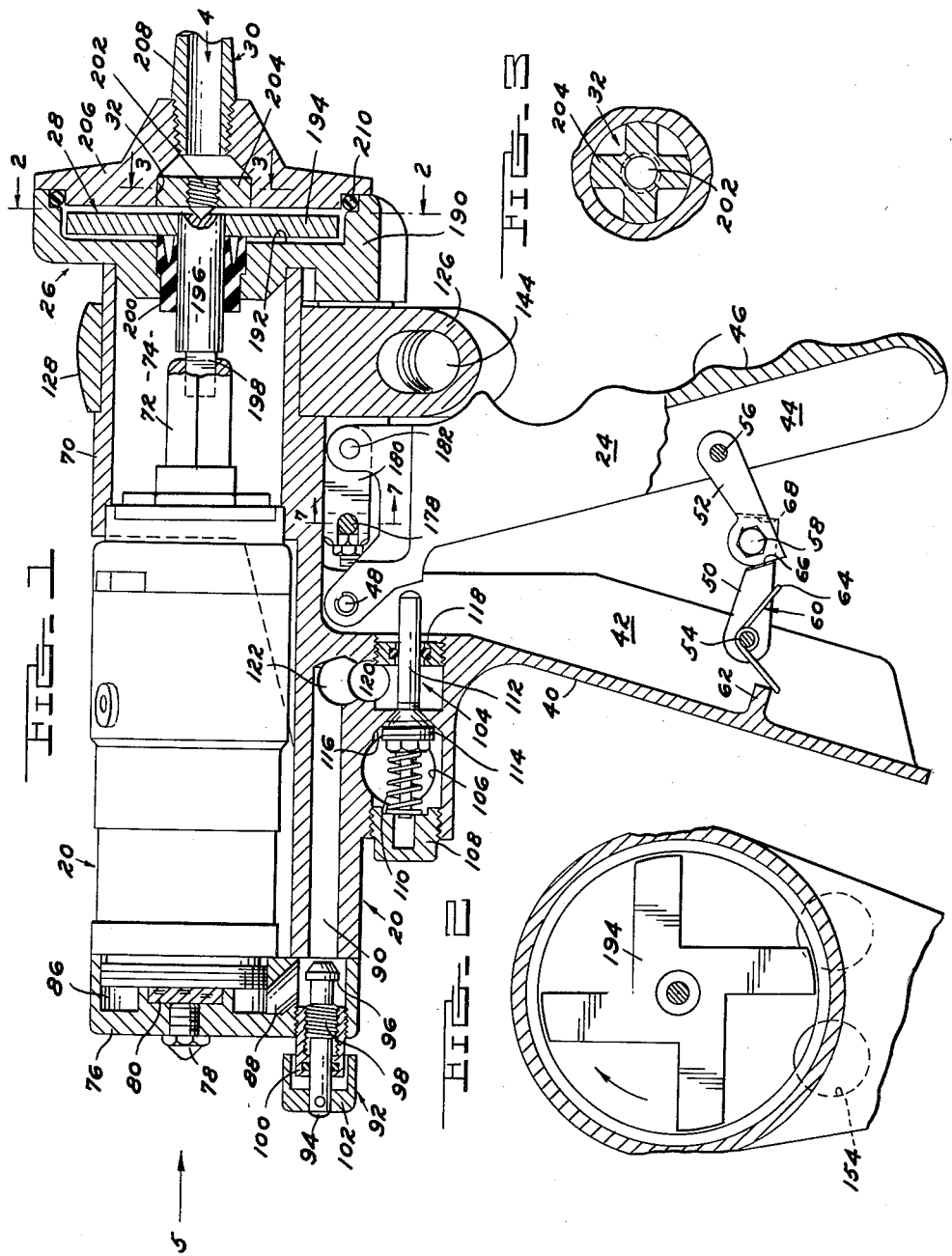

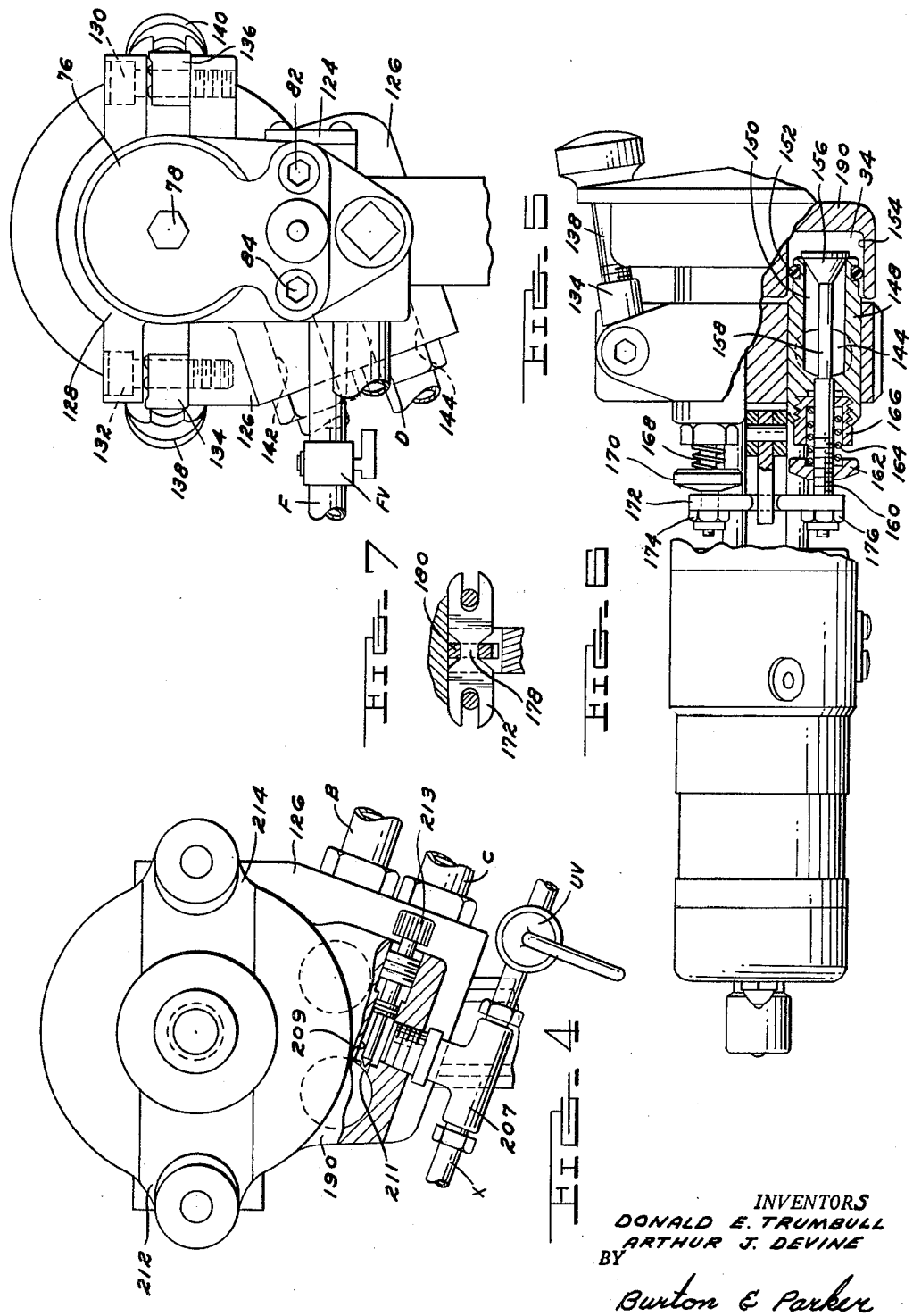

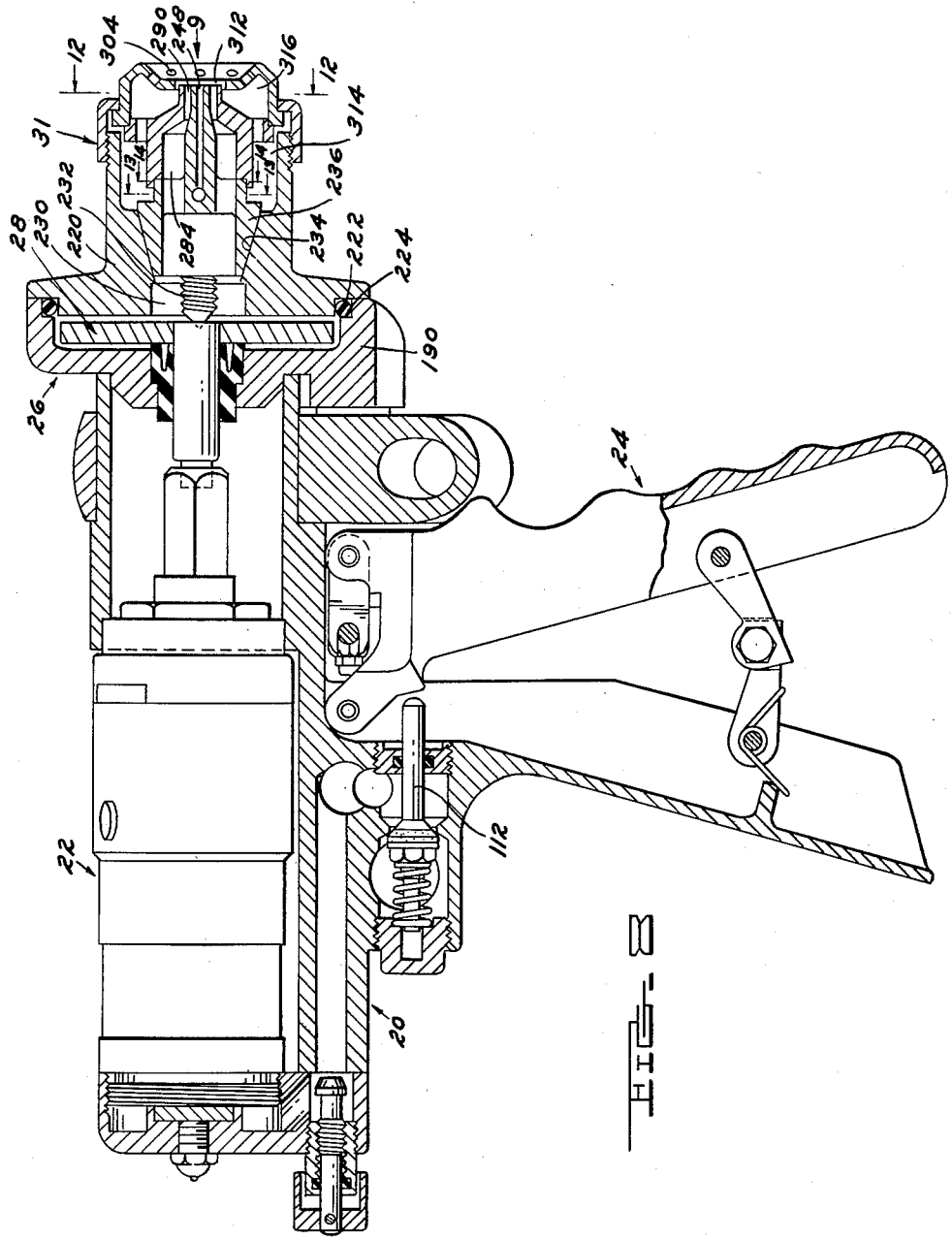

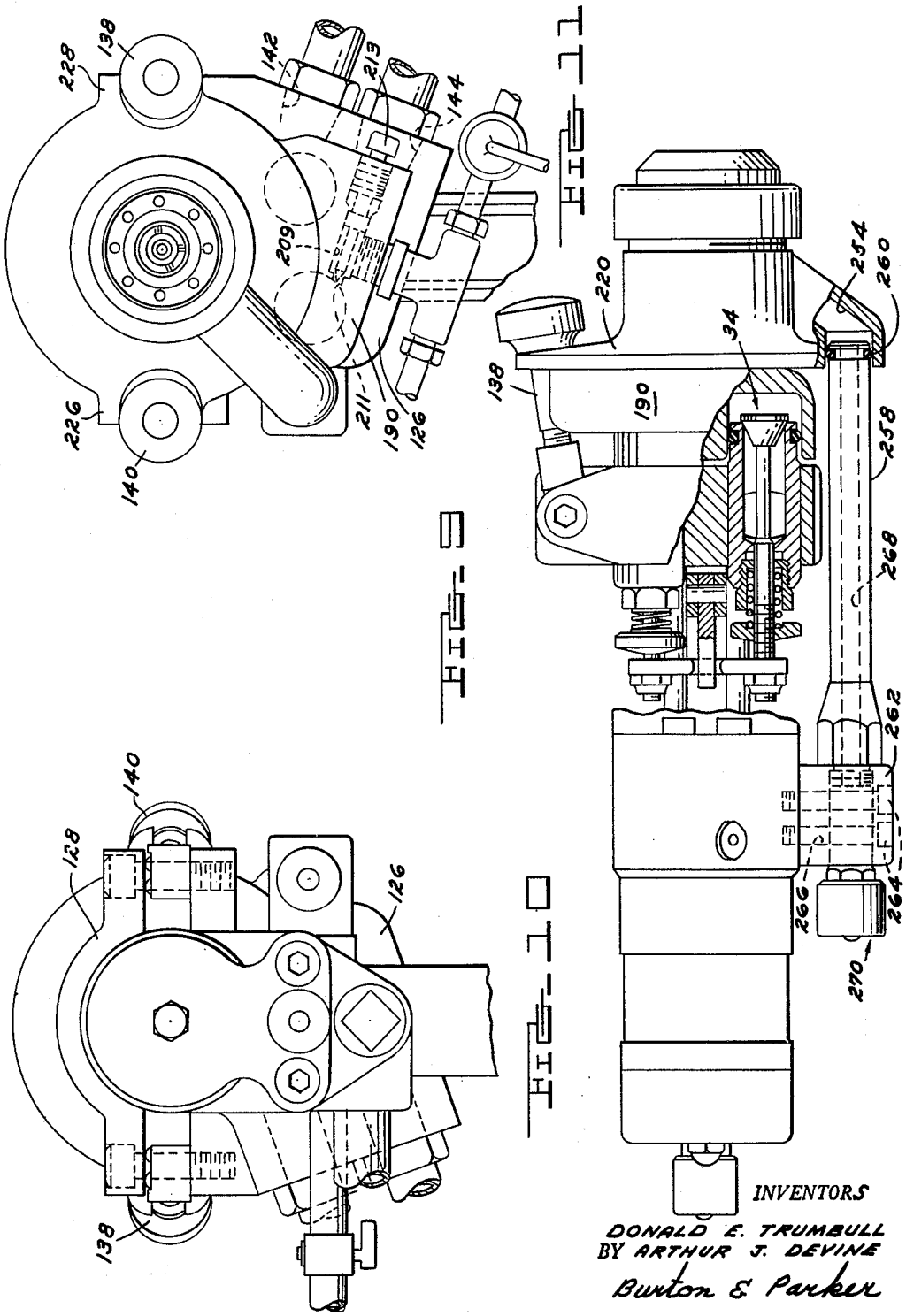

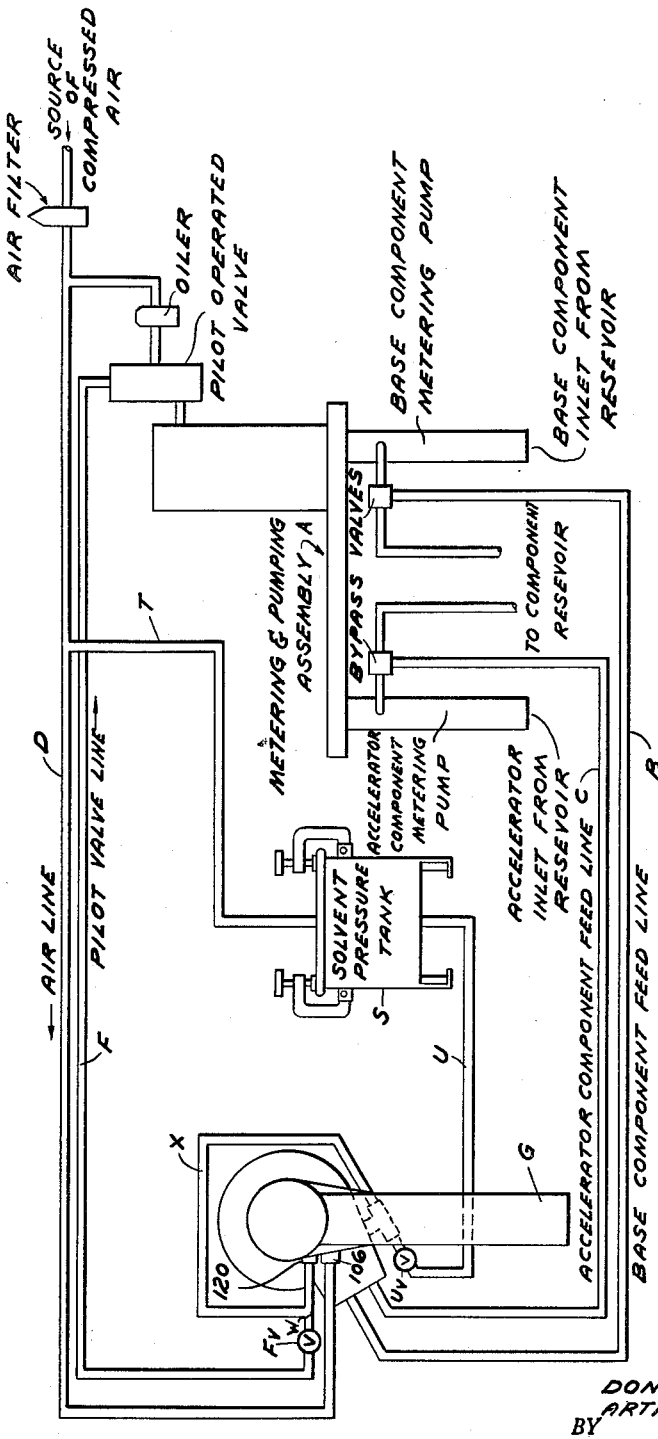

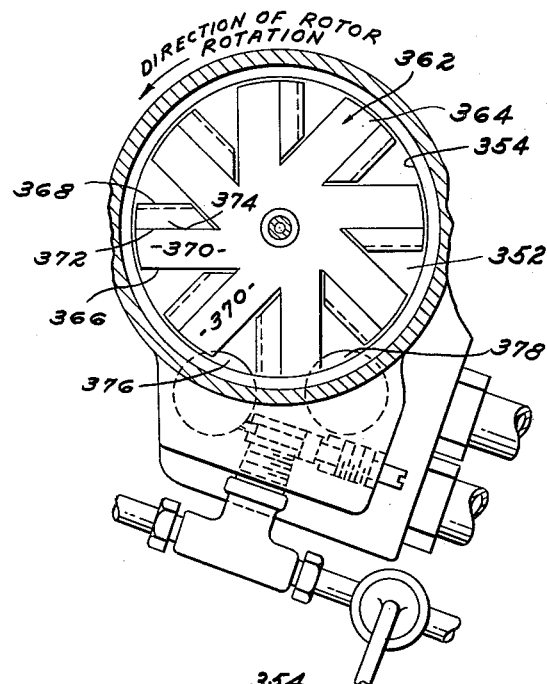
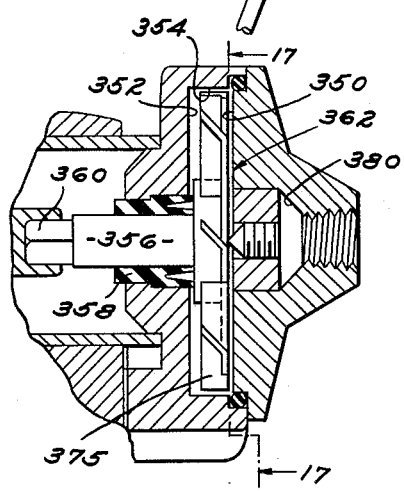

# United States Patent Office 3,053,457
Patented Sept. 11, 1962

3,053,457
DEMAND MIXING AND DISPENSING GUN FOR MULTICOMPONENT MATERIALS
Donald E. Trumbull, Birmingham, Mich., and Arthur J. Devine, Lawndale, Calif., assignors to Pyles Industries, Inc., Detroit, Mich., a corporation of Michigan
Filed Aug. 18, 1960, Ser. No. 50,428
15 Claims. (Cl. 239—142)

This invention relates to guns for applying, as by spraying or merely flowing onto surfaces to be coated multi-component materials, such as two-part resins, sealers, plastics, etc., of the types commercially known as epoxies, polyurethanes, polyesters, foams, etc., and generally comprising a base component and a catalyst, or, as sometimes termed, an accelerator or curing component.

As the desirability of coating surfaces with two-part resins, sealers, and the like has become more apparent, a demand has arisen for a gun which will handle these materials in an efficient and effective fashion and will dispense or apply the materials with the components thereof properly mixed together and with the mixture of the proper consistency or desired character. Guns heretofore available for dispensing coating materials have not always proven successful in use with these relatively new and frequently rapidly curing multi-component materials such as the epoxies, polyurethanes, etc., above mentioned. The base and accelerator components are mixed together just prior to application of the mixture to the work surfaces and with many such materials the mixture begins to cure at room temperatures as soon as it is mixed. Some mixtures may cure in a few seconds. Because of this tendency of the material to cure once the separate components are mixed together, equipment for applying such mixtures to work surfaces requires features not found in conventional material-applying guns.

If the mixed material is allowed to remain in the gun for a period exceeding the "pot life" of the material, the gun may be rendered useless as many of these new materials, once they have cured, are not susceptible to removal from a gun in which curing has occurred. Further, in the handling of these materials it is desirable to mix the respective components intimately together just prior to their application to the work surfaces and this requires that they be mixed in the gun immediately prior to dispensing therefrom.

In conventional material-applying guns it has generally not been necessary to pay as much attention to the tendency of the material handled by the gun to harden in the gun as it is in the handling of these new two-part or multi-component materials. Therefore a gun for handling these multi-component materials must be so constructed that those portions of the gun containing the mixed components may be readily cleaned of the mixed material once the gun is to be laid aside for a period exceeding the curing time of the mixture therein. To this end, the gun must be so constructed that mixed material does not lodge itself in inaccessible places, or so that one component cannot back up into a space containing the other component to cure in such space. Preferably, also, the gun should be capable of disassembly quickly and easily to remove from it those portions thereof containing the mixed material, with such portions themselves being readily separable so that the mixed material may be entirely removed therefrom.

The guns disclosed herein are adapted for use with component material metering and pumping apparatus under remote control of the operator handling the gun, the operation of such apparatus preferably being controlled by the same device, such as a trigger, on the gun which the operator actuates to fire the gun.

It is the primary and general object of this invention to provide a relatively inexpensive gun which will handle a high volume of a wide variety of multi-component materials and which will intimately mix the components together and thereafter apply the mixture to the work surfaces on demand of the gun operator, and which gun is easy to clean, to disassemble, positive and non-drooling at shut-off, light weight, and reliable and rugged for high production use.

More specifically it is an object to provide a gun having a self-contained motor and a mixing and dispensing assembly removably mounted on the gun with the mixer portion of the assembly disengageably connected to the motor so that upon completion of gun use, as at the end of a working day, the mixing and dispensing assembly may be removed from the gun for thorough cleaning while the remainder of the gun remains connected to the component material metering and pumping apparatus. A concomitant object is the provision of a component infeed system for delivering the multi-components to the mixing chamber of the gun, with such infeed system also permitting the aforementioned removal of the mixing and dispensing assembly without thereafter allowing the separate components to either drool from the then exposed discharge end of the infeed system or become mixed together at the point of disconnection of such system and the mixing and dispensing assembly.

Another object of the invention is the provision of a multi-component infeed system in a gun of the character mentioned in which each component delivery line into the mixing chamber, at the point of discharge into the chamber, is provided with a valve preventing reverse flow of material in the chamber back into the infeed system with such valve opening only to discharge component into the chamber. A concomitant object is the provision of an infeed system of the character mentioned in which the valves at the discharge end of the infeed system are positively locked closed when the operator does not desire the admission of components to the mixing chamber, and when delivery is desired are unlocked and open only when the pressure of the components within the infeed system exceeds a predetermined minimum.

Another object of the invention is the provision of a gun of the aforementioned character in which the component infeed system is provided with two separate passageways, one for each component to be delivered to the mixing chamber, with each passageway provided with a valve by which the flow of component through such passageway may be positively interrupted or allowed as the operator of the gun releases or squeezes, respectively, the gun trigger, and with one of the valves being adjustable to entirely prevent or vary component flow while the other valve is opened by squeezing of the trigger, thereby allowing an adjustment of the pressure in the infeed line connected to the valve-controlled passageway so that the delivery pressure of both components may be equalized even though one component may be delivered to the gun at a higher rate than the other component, and also thereby allowing, when the adjustable valve is entirely closed, the purging of the mixing chamber by the flow of but one component when the trigger is squeezed.

Another object of the invention is the provision of a multi-component material mixing and dispensing gun having an air-driven motor contained in the gun and disengagably connected to a mixer assembly removably mounted on the gun, with such mixer assembly having means for receiving and directing air under pressure into material being mixed by the assembly.

Another object of the invention is the provision of a spray nozzle for spraying multi-component materials of the type heretofore mentioned which provides, at the nozzle discharge opening, a central air jet, an encircling hollow cylindrical jet of multi-component material encircling and coaxially arranged with the central jet, an outer hollow cylindrical air jet encircling in coaxial relation the multi-component material jet, and a plurality of diffusing air jet streams blowing upon the exterior of the aforementioned jets of air and material.

Another object of the invention is the provision of a gun of the aforementioned character having means for admitting a solvent to those portions of the gun containing or likely to contain a mixture of base and accelerator components for purging or flushing such mixture from the gun while the mixer is operated and the admission of base and accelerator components to the mixer is interrupted.

Other objects, advantages, and meritorious features will more fully appear from the specification, claims, and accompanying drawings, wherein:

FIG. 1 (sheet 1) is a side view partially in section of a flow gun embodying the invention;

FIG. 2 (sheet 1) is a cross sectional view taken on the line 2—2 of FIG. 1 showing the mixer rotor;

FIG. 3 (sheet 1) is a cross sectional view taken on line 3—3 of FIG. 1 showing the forward stabilizing bearing for the mixer rotor;

FIG. 4 (sheet 2) is a front end view of the gun of FIG. 1 looking in the direction of arrow 4 in FIG. 1;

FIG. 5 (sheet 2) is a rear end view of the gun of FIG. 1 looking in the direction of arrow 5 in FIG. 1;

FIG. 6 (sheet 2) is a top view, partially in section, of the gun of FIG. 1;

FIG. 7 (sheet 2) is a cross sectional view taken on line 7—7 of FIG. 1;

FIG. 8 (sheet 3) is a side view partially in section of a spray gun embodying the invention;

FIG. 9 (sheet 4) is a front end view of the gun of FIG. 8 looking in the direction of arrow 9 in FIG. 8;

FIG. 10 (sheet 4) is a rear end view of the gun of FIG. 8 looking in the direction of arrow 10 in FIG. 8;

FIG. 11 (sheet 4) is a top view partially in section of the gun of FIG. 8;

FIG. 12 (sheet 5) is a cross sectional view through the spray nozzle taken on line 12—12 of FIG. 8;

FIG. 13 (sheet 5) is a cross sectional view through the spray nozzle taken on line 13—13 of FIG. 8;

FIG. 14 (sheet 5) is a cross sectional view through the spray nozzle taken on line 14—14 of FIG. 8;

FIG. 15 (sheet 5) is an exploded view of the spray nozzle assembly;

FIG. 16 (sheet 6) is a schematic drawing of the gun connected to component material metering and pumping equipment for supplying material components to the gun and also showing the compressed air lines for operating the gun and remotely controlling the metering and pumping equipment;

FIG. 17 is a cross-sectional view of a modified mixer rotor taken along line 17—17 of FIG. 18; and FIG. 18 is a cross sectional view through the mixer of FIG. 17.

The invention disclosed in this application is embodied in a gun for receiving a plurality of separate material components, mixing them together and dispensing them as a mixture, either as a stream, bead, or the like, as in the case of the flow gun of FIG. 1, or as a spray, as from the spray gun of FIG. 8. The gun is connected to apparatus for metering the material components in accurately controlled relative proportions as shown in FIG. 16. This figure depicts schematically pumping and metering equipment at A from which the material components in the accurately metered proportions are delivered by lines B and C to the gun G. The gun is supplied with operating air by the air line D from a source of compressed air (not shown). Starting and stopping of the metering and pumping apparatus A, which is driven by compressed air, is under the control of valve E which is opened to start operation of apparatus A when pilot line F is pressurized. Line F, which contains a manually operated shut-off valve FV, is pressurized, when valve FV is open, by the actuation of a trigger on the gun as hereinafter explained. Upon depressurization of line F, valve E closes stopping operation of apparatus A and thereby interrupting further delivery of material component to the gun. If valve FV is closed when the gun trigger is actuated, then line F is not pressurized beyond the valve FV and apparatus A is not started. Apparatus A is more fully disclosed in the U.S. patent application of Trumbull et al., Serial No. 133, 530, filed August 23, 1961, which application is a continuation-in-part of the U.S. patent application of Trumbull et al., B & P 60007-M, Serial No. 59,327, filed September 29, 1960, now abandoned.

FIG. 16 also shows a solvent pressure tank S containing a solvent for cleaning the gun. Air pressure for pressurizing the tank is delivered by line T. A solvent delivery line U, having a valve UV, is connected to the gun as hereinafter described. Air line D may be provided with a T connection W to which a short line X is connected at one end with the opposite end of line X connected to discharge into the gun as hereinafter described.

The constructions of FIGS. 1 and 8 are similar except for the nozzle assembly for dispensing the mixed material from the gun. The guns of FIGS. 1 and 8 comprise generally the same major components which, for convenience, have been similarly numbered, namely, a gun body 20, a motor 22 mounted on the body, means in the form of a trigger 24 mounted on the gun body and operatively coupled with the motor for controlling its operation, mixing means 26 removably mounted on the body and having a mixing chamber with a mixing rotor 28 therein disengageably connected with the motor 20, and a nozzle assembly 30 (FIG. 1) or 31 (FIG. 8) mounted on the gun body and adapted to receive mixed material from the mixing chamber for dispensing the material from the gun. Each embodiment provides a discharge outlet 32 (see FIG. 3) for mixed materials from the mixing chamber and a plurality of material component valve-controlled inlets, one of which is shown at 34 in FIGS. 6 and 11, which are opened and closed under the control of the trigger 24.

*Flow Gun*

The gun body 20 of the flow gun shown in FIG. 1 is provided with a rigid and integral downwardly and somewhat rearwardly extending handle 40. The interior of the handle may be hollow, as at 42. The trigger 24, whose interior may also be hollow as at 44, is preferably provided with finger-engaging reliefs 46 and is pivotally mounted on the gun body as at 48. The trigger and handle 40 are tensioned apart by a spring-biased toggle mechanism which includes a pair of toggle links 50 and 52 pivotally connected at 54 and 56 to the handle and trigger and pivotally connected together at 58, with a spring member 60 encircling the pivot 54 with one end bearing against an ear 62 on the interior of handle 40 and with the other end bent to underlie at 64 the link 50. Links 50 and 52 are relieved in the area of their overlapping pivoted connection to provide a pair of shoulders 66 and 68, which limit the upward movement of the point of pivotal connection 58 under the action of spring 60. It will be noted that while pivot points 54, 56, and 58 do not lie in a straight line as viewed in FIG. 1, they are close to being in alignment and therefore, when the operator grasps the trigger, with the thumb and palm of his hand extending around the handle and with four fingers encircling the trigger, and attempts to squeeze the trigger toward the handle, there is an initial resistance to movement of the trigger caused by the very nearly rectilinear alignment of the pivot points 54, 56, and 58 of the toggle. As the squeezing pressure by the operators increases, the toggle mechanism suddenly "breaks" loose and the trigger moves toward the handle with much less effort. This toggle mechanism therefore provides a means for preventing accidental firing of the gun when it is laid down as, for example, on the ground, but more importantly provides a sudden opening of the various valve mechanisms in the gun when the operator squeezes the trigger. Were such toggle mechanism not provided, the operation of the gun would be more dependent upon the operator's "touch" in squeezing the trigger. With the provision of the toggle mechanism, the operator must exert a sufficient force to "break" loose the toggle and this force is sufficient so that the trigger is thereupon moved suddenly toward the handle and proper operation of the gun is ensured.

The gun body adjacent its forward end is provided with a hollow cylindrical portion 70 within the rear of which the motor 20 is received. The motor may be a conventional air-operated motor. It has a drive shaft 72 extending forwardly thereof and into the space 74, for connection with the shaft of rotor 27 of the mixer. The rear end of the motor 20 is threadedly received within a closure plate 76 as shown in FIGS. 1 and 5 having an oil plug 78 which communicates with an oiled wick 80. The plate is held to the body of the gun by a pair of bolts or the like 82 and 84, as shown in FIG. 5. The direction of the threaded connection between the motor and plate 76 is such that as the motor is operated it will not unthread from the plate but rather be held against rotation by the plate.

Internally plate 76 is relieved to allow for the admission of compressed air to the inlet at the rear of motor 20 and for this purpose has an annular air passage 86 and an angular communicating passage 88 which connects with an air passage 90 in the gun body through a speed control valve 92. The speed control valve is for the purpose of regulating the speed of the air motor by controlling the amount of air admitted to the motor. The speed control comprises a valve stem 94 having a valve head 96 cooperable with the adjacent end of passageway 90 to control the iar flow between the valve head and the end of the passage 90. The stem is threaded as at 98 and is carried by an internally complementary threaded bushing 100, which is threadedly mounted in the plate 76. The valve is provided with a cap-like handle 102 so that the stem may be rotated by the gun operator to regulate the motor speed. The regulation of motor speed is important as certain material components require mixing at a higher rate of speed of the mixer rotor than do other component materials and therefore provision must be made for varying the speed in accordance with the materials being mixed.

Valve means are provided on the gun body cooperable with the trigger 24 for controlling the starting and stopping of the air motor 20 and in the case of the spray gun of FIG. 8, as hereinafter mentioned for additionally controlling the admission of air to the spray nozzle assembly. Such valve means are shown in FIG. 1 at 104. Air from a source of compressed air is delivered by line D and admitted to the gun through an inlet port 106 at the side of the gun body. Such air enters a cylindrical cavity closed at the rear end by plug 108 which bears against a coil spring 110. The coil spring tensions a valve stem 112 forwardly to close a valve head 114 thereon against a tapered shoulder 116 at the forward end of the cylindrical cavity. The forward end of stem 112 is disposed to abut the trigger 24 to be shifted rearwardly upon squeezing of the trigger, thereby opening the valve and allowing the passage of air forwardly along the valve stem and upwardly into the passageway 90. A bushing carrying an O-ring seal or the like 118 encircles the stem and is threadedly connected in the body member to seal against the escape of air.

Communicating with the air passing from the valve 104 to the passageway 90 is a port 120 opening laterally through a side of the gun for connection to the pilot line F extending back to apparatus A (FIG. 16). A manually operated shut-off valve FV is in the pilot line adjacent the gun for ready operation by the gun operator for a purpose hereafter explained. When valve 104 is opened to start operation of air motor 20, air passes through port 120 to pressurize the pilot line connected therewith, assuming valve FV is open, to cause the opening of valve E in the metering apparatus whereby base and catalyst components from such apparatus are delivered under pressure through lines B and C to the gun.

Also communicating with the air admitted to passage 90 when valve 104 is opened is a laterally opening port 122 which, in the flow gun of FIG. 1, is closed by a plate 124, but its function in the spray gun will be described hereinafter.

Mounted on the cylindrical portion 70 of the gun body forwardly of the trigger 24 is a manifold assembly comprising a manifold block 126 and a retainer 128, with the block and retainer being clamped about the cylindrical portion 70 by a pair of cap screws 130 and 132, as shown in FIG. 5. Swingably mounted on the cap screws between the block and retainer 128 are screw sockets 134 and 136 in which are threadedly received the thumb screws 138 and 140 for removably holding mixing means 26 on the gun body.

The manifold block 126 is provided with a plurality of material component passageways, each of which communicates with an inlet port for the mixing chamber of mixing means 26. The guns disclosed in this application are adapted to receive two material components, a base component and an accelerator component, as shown in FIG. 16. The passageway for the base component is shown in phantom at 142 in FIG. 5 and the passageway for the accelerator component is shown at 144. Each passageway extends laterally and upwardly in the manifold block to communicate with an inlet port to the mixing chamber.

The inlet port for the accelerator component and its associated valve is indicated at 34 in FIG. 6. The port is defined by a cylindrical member 148 press fitted within the manifold block and extending completely therethrough, as shown in FIG. 6. It is provided with a cylindrical bore 150 which communicates with the passageway 144 and forming an extension thereof. The forward end of member 148 is provided with an annular groove within which an O-ring seal or the like 152 is disposed to establish a sealing connection with a complementary aperture 154 opening into the mixing chamber in the member 190. Disposed within member 148 is a valve having a cone-shaped head 156 at the end of a valve stem 158. The valve stem is threaded, as at 160, with an adjustable nut 162 mounted thereon and tensioning a spring 164 against the bottom of a counterbore in a bushing 166. It will be noted that the valve closes component passageways 148 and 150 at the discharge end thereof and because the valve is spring tensioned, acts as a check valve against reverse flow of material from aperture 154 back into passageways 148 and 150.

The inlet port for the base material is constructed in a similar fashion and provided with a similar valve, upon the threaded stem 168 of which is mounted a corresponding adjustable nut 170. Received over the stems of the valves is a yoke member 172. The yoke is retained on the stems by lock nuts 174 and 176.

Yoke 172 is shaped as shown in FIGS. 6 and 7 having a narrow cylindrical neck portion 178 over which is received the slotted end of a toggle link 180. The toggle link is pivotally connected as at 182 to an upstanding ear on the trigger, as shown in FIG. 1.

With the construction above described, it will be noted that when the trigger is in the position shown in FIG. 1, the pivots 48 and 18, and the narrow neck 178, lie in a straight line whereby the inlet valves for the base and accelerator inlet ports are locked closed. On the other hand, when trigger 24 is squeezed to swing the pivot point 182 downwardly, the valves are unlocked and will open when the pressure at the base and accelerator materials is sufficient to unseat the valve heads, such as head 156, to force component material from the bore 150 into the mixing chamber. It is also apparent that while the inlet valves are open, if the trigger is released by the operator, the toggle 180 will urge the yoke 172 rearwardly, forcing the valves closed and locking them in the closed position. It will also be apparent that by adjusting the nuts 162 and 170 on the threaded valve stems 158 and 168, the amount of tension holding the valves closed after the trigger has been squeezed, may be adjustably varied. In Fig. 6, for exaxmple, nut 162 has been threaded down valve stem 168 a greater distance than nut 170 on stem 168 and therefore a greater pressure will be required to unseat valve head 156 than the corresponding valve head of the stem 168. In this fashion an adjustment on the inflow pressure of the base and accelerator material components may be effected at the gun to ensure that the pressures in each line are substantially equal or reach a desired pressure before admission of component to the mixing chamber even though a much larger quantity of one of the components is admitted to the mixer than the other component.

The adjustability of the spring tension on the inlet valves also serves to accommodate the valves for different viscosities of component material. Frequently one material component may be less viscous than the other material component and a greater spring tension required on the inlet valve for the one component in order to ensure tight closure than for the other inlet valve. The nuts 162 and 170 allow for adjusting the tension on the valves to accommodate for the variance in component viscosity.

The adjustable nuts 162 and 170 also provide one way of purging the mixing chamber of mixed material. For example, the nut 162 may be adjusted along valve stem 158 to a position abutting bushing 166 and in this position valve head 156 is locked closed even though trigger 24 is squeezed and material component is delivered to the valve at a pressure normally great enough to open it. Material will then enter the mixing chamber only through the base component inlet port and mixed material in the mixing chamber will be forced therefrom by the base material entering the chamber. When sufficient base material has entered the chamber to purge it of mixed components, the trigger may be released and as the chamber now contains only base material, no curing of material in the chamber will occur and the gun may be laid aside for a period exceeding the pot life of the mixed components.

It will be noted that by disposing the effective flow controlling point of the inlet valve mechanism at the very end of the bores 150 of the inlet ports for the mixing chamber, when such valves are closed there is no appreciable quantity of component material between the control point and the mixing chamber which might continue to "drool" into the mixing chamber. Also, as the valves are only unseated by component under pressure and will close upon any attempt of component in the mixing chamber to flow backwards and into the inlet ports, there is no danger of one component "backing up" in the feed line for the other component and thereby allowing an unintentional curing of the two components in one of the infeed lines or inlets.

The mixer 26 comprises an assembly removably mounted on the forward end of the gun. The assembly includes the member 190 interiorly recessed to provide a mixing chamber 192. Disposed within the mixing chamber is a mixing rotor 194 which may be of a configuration similar to that shown in FIG. 2, or that of FIGS. 17 and 18, which is secured for rotation upon a supporting shaft 196 having a square end 198 removably received and supported in driven engagement in a complementary socket in the end of shaft 72 of the motor 20. Encircling shaft 196 is a combination seal and shaft supporting bearing 200 formed of any suitable material, preventing the escape of mixed material from the mixing chamber rearwardly along the shaft. The rotor is held rearwardly at the forward end within the mixing chamber by a cone-shaped bearing 202 threadedly mounted within a bearing cage or spider 204, which is press fitted within a central opening 32 in the mixing chamber cover 206. The mixing chamber cover 206 forms a portion of the mixing means as well as a portion of the nozzle assembly. In the flow gun the mixing chamber cover, as shown in FIG. 1, is provided with a threaded aperture communicating with the opening 32 to threadedly receive a flow nozzle 208 of any desired type. The cover plate 206 is provided with an annular shoulder encircled by an O-ring seal or the like 210 which cooperates with a complementary annular seat in the member 190 to establish a pressure-tight seal between the cap and the mixing chamber. The cover 206 is provided with a pair of bifurcated diametrically opposed ears 212 and 214 within which the thumb screws 138 and 140 may be swingably received and against which the heads of the screws may be tightened to hold the cover plate in sealing engagement with member 190 and to support the mixing means and nozzle assembly removably upon the gun body.

It will be apparent that, upon loosening of the thumb screws 138 and 140, they may be swung outwardly and the cover plate 206, member 190, and the rotor 194 entirely removed from the gun. This allows for quick disassembly for cleaning of the mixing chamber and rotor at the end of gun use. It will be noted that when the mixing chamber is removed from the gun, the material component inlet ports will not drool material component therefrom as the inlet valves are disposed at the outlet of each port.

The rotor of FIG. 2 in mixing material components rotates in the direction of the arrow shown in FIG. 2 and intimately mixes the base and accelerator components together within the mixing chamber. Mixed material is forced from the chamber through opening 32 by the pressure of components entering the chamber through the inlet ports.

In the mixing of certain two-part materials as, for example, some of the foams, it has been found desirable to admit air under pressure to the mixing chamber during mixing of the foam components. This air serves to enhance the intimate mixing of the base and catalyst components. In FIGS. 4 and 16 an air line X is shown connected into the pilot air line F between the gun and the shut-off valve FV. This air line communicates with the mixing chamber, through a T 207, which is threaded in the member 190, as shown in FIG. 4. Into the other side of the T 207 is connected valve UV to which the solvent line U is connected. T 207 is disposed to discharge into a cylindrical chamber 209 formed in the member 190. The chamber 209 empties through a passageway 211 into the aperture 154. A needle valve or the like 213 is mounted in member 190 to serve as a positive shut-off for the entry of either air or solvent into the mixing chamber. The nose of the needle valve is adapted to close the small passage 211. It will be noted that the effective flow-controlling point or valve seat of this valve is close to the mixing chamber.

With valve 213 open, and valve UV closed, when the trigger 24 is squeezed, air will be admitted to the mixing chamber as component material is being mixed therein by the mixer rotor. The air admitted to the mixing chamber serves to cause a more intimate mixing of the base and catalyst components. Its effect is to produce, in the case of foams, a foam which is of uniform texture and consistency. It has been found that without the admixing of air and component materials at the time of the mixing of the components together in the mixing chamber, the resulting foam is not of as uniform consistency. While it is possible to produce satisfactory foam without the use of air in the mixing chamber, it has been found that the results obtained with the use of air are more consistent.

In applying some of these two-part materials to work surfaces, as, for example, vertical surfaces, it is desirable to have the mixture cure rapidly so that it will not "run" on the vertical surface. Also, in certain production line applications, it is desirable to have the mixture set up rapidly. In applying certain foaming materials, the relative proportions of base to catalyst are such that within two seconds following the admixture of the components, the mixture will have foamed or risen and at the end of five seconds will have become non-tacky to the touch. In handling materials which will cure in this short space of time, it becomes apparent that the gun must be adapted for almost instantaneous cleaning once the use of the gun is to be interrupted.

To effect cleaning of the mixing chamber and nozzle assembly where the material will cure within two to five seconds, the operator, when ready to interrupt further use of the gun, and with the trigger squeezed, closes valve FV and opens valve UV, whereupon the delivery of component materials from apparatus A will be interrupted and solvent will be admitted under pressure to the mixing chamber and from thence to the nozzle assembly. This admission of solvent to the mixing chamber and nozzle assembly will occur while the gun remains in operation and substantially simultaneously with the interruption of the flow of material components to the mixing chamber. Therefore, the gun may be cleaned of a mixture of base and catalyst materials before the same have had an opportunity to cure in the gun. Once the mixing chamber and nozzle assembly have been thoroughly flushed with solvent, the trigger should be released and the gun laid aside.

It will be noted that the solvent is admitted to the mixing chamber adjacent the inlet port for the accelerator component. The presence of even a very small amount of accelerator in the mixing chamber with base component will cause some curing action and therefore it is necessary to ensure a thorough flushing or cleaning of all catalyst from the mixing chamber and nozzle assembly from a point adjacent the inlet port for the accelerator component.

Valve 213 may be closed to prevent the inflow of either air or solvent to the mixing chamber or may be used to control the rate at which air or solvent enters the mixing chamber.

It will be noted that at the time solvent is being admitted to the mixing chamber, air is also being admitted. The simultaneous admission of air and solvent enhances the cleaning of the chamber and nozzle assembly as the air serves to scrub the surfaces with solvent.

*Spray Gun*

The spray gun shown in FIG. 8 is substantially the same construction as the flow gun of FIG. 1, differing from the latter in the spray nozzle assembly. A repetitious description of corresponding parts is unnecessary, it being noted that corresponding parts of the spray gun heretofore described in connection with the flow gun are indicated in FIGS. 8–11 by corresponding reference numerals.

The spray nozzle assembly includes a nozzle body 220 provided with an annular shoulder upon which is seated an O-ring or the like 222 cooperable with a complementary recess 224 in the manifold block 190 to sealingly close the forward end of the mixing chamber. The nozzle body is held removably on the gun body 20 by the thumb screws 138 and 140, which are received in slotted ears 226 and 228 diametrically opposed at the rear end of the nozzle body. The nozzle body is interiorly apertured to provide a material discharge outlet for mixed material in the mixing chamber with a spider 230 pressed within the aperture and carrying a bearing 232 having a cone-shaped nose received in a conical recess in the front face and at the rotational axis of the mixer rotor.

Forwardly of the spider the aperture through the nozzle body flares outwardly as at 234 to receive in fluid-tight sealing relation a first orifice-defining member 236 shown in FIGS. 8, 13, and 15. Such member is provided with an axially extending mixer component passageway 238. In the forward end of such member the passageway is shaped to provide a somewhat semi-circular passageway portion 240. The material of member 236 extends radially inwardly at passageway portion 240, as at 242, to provide an air passageway 244 and a forwardly extending air jet nozzle 246 having an air passageway 248 therethrough communicating with passage 244. The exterior of member 236 radially opposite passage 244 is relieved as at 250.

The interior of the nozzle body forwardly of the taper 234 is formed to provide an enlarged cylindrical recess 252 with which a downwardly and rearwardly extending air passage 254 communicates. Passage 254 terminates at its lower end in a cylindrical port 256 cooperable with air delivery passage 258 having at its forward end an O-ring seal or the like 260 cooperable with the port to seal the forward end of the pipe in air-tight relation with the port. The rear end of passage 258 is threadedly received within a mounting block 262 secured to the side of the gun body as by cap screws 264. The interior of block 262 is provided with an air passageway 266 communicating with the laterally opening port 122 in the gun body which communicates with air passage 90. Passage 266 also communicates with an air passage 268 extending through pipe 258. An air control valve generally indicated at 270 and of a construction similar to the speed control valve 92 heretofore described in connection with FIG. 1 is mounted in block 262 to control the volume of air admitted from port 122 to the pipe 258 and thence to the spray nozzle.

It will be understood that by removing the thumb screws 138 and 140 from engagement with the nozzle body 220, the nozzle assembly may be removed from the gun body and disconnection of air passage 254 from pipe 258 automatically effected, and that when the nozzle body is replaced on the gun and the thumb screws tightened, a connection between pipe 258 and passage 254 is automatically effected.

The exterior of the nozzle portion 246 of member 236 has a cylindrical surface at 272 which terminates forwardly in a tapering surface 274 merging into a smaller cylindrical surface 276. Telescoped over the forward portion of member 236 is a second orifice-defining member 278 having at its rear end a shoulder portion 280 which is received over the forward edge of the surface 250 of member 236. The interior of member 278 forwardly of shoulder 280 is cylindrically bored as at 282 and when members 236 and 278 are telescoped together, bore 282 and passage 238 cooperatively define a mixed component passageway generally indicated at 284 in FIG. 8. Passage 284 terminates at its forward end in a taper 286 formed on the interior of member 278, which in turn terminates in a cylindrical bore 288. Bore 288 encircles cylindrical tip 276 and a portion of the taper 274 of the first orifice-defining member 236. Bore 288 cooperates with surfaces 274 and 276 of member 236 to define a mixed component material-delivery orifice indicated in FIG. 8 at 290. Orifice 290, it will be noted, is cylindrical or annular to discharge a cylindrical stream or hollow cylinder coaxially enveloping a jet of air issuing from the passage 278 of nozzle portion 246 of the first orifice-defining member.

The second orifice-defining member 278 is provided with a radially extending frame 292 having a forwardly facing shoulder 294 and provided at angularly spaced points with short passages 296. Shoulder 294 serves to support in coaxial alignment the third orifice-defining member 298 which is generally cup-shaped but has an inwardly extending bottom as at 300. The bottom 300 of the third orifice-defining member tapers inwardly and rearwardly as at 302 and is provided at angularly spaced points with a plurality of air orifices 304. The bottom wall is also provided with a central aperture 306 through which the nose 308 of member 278 and the tip 276 of member 236 may extend. The cylindrical surface 310 of the nose 308 of member 278 cooperatively defines with the encircling surface of aperture 306 a third orifice 312. Air within the chamber 314 formed by the encircling wall of aperture 252, and the exterior surfaces of members 236 and 278, passes through the short passageways 296 into the air chamber 316 within the cup-shaped member 298 and from thence escapes through this third orifice 312 in a hollow cylindrical stream which is coaxially aligned and envelops air jet from passage 248 and the mixed material jet from orifice 290.

Playing upon the three above-described jets of air and mixed material are the diffuser air jets which issue from the orifices 304 at an angle and angularly about the aforementioned air and material jets. As the air escapes from passage 248, it tends to rapidly expand and as a hollow cylinder of mixed material surrounds it, the material is forced to expand as well. The expansion of the material, however, is controlled by the enveloping layer of air issuing from the orifice 312. As the air jets from passage 248 and orifice 312 expand with the mixed material between them, they react upon the material to break it up into a fine spray. The break-up of the mixed material is further enhanced by the action of the dispersion jets of air issuing from orifices 304. The result is to provide a fine dispersion of air and mixed material issuing from the nozzle. This arrangement is satisfactory for breaking up what is otherwise relatively viscous mixed material and has proven to be extremely satisfactory.

The various components of the nozzle assembly are held together by a retainer in the form of a cup-shaped cap 318 internally threaded at 320 to be threadedly received over a complementary thread 322 at the forward end of the nozzle body. The retainer is provided with a central opening 324. The inwardly extending bottom wall 326 overlies the forward face of flange 328 of the third orifice-defining member and serves to urge the three orifice-defining members tightly together and toward the nozzle body 220.

It is now apparent that upon squeezing trigger 24, the air motor 22 will be pressurized and caused to operate and simultaneously air will be admitted to the spray nozzle. The arrangement of the trigger and valve stem 112 is such that the air motor will be started and air admitted to the spray nozzle prior to any substantial unlocking of the material inlet valves admitting material to the mixing chamber. Therefore, at the time material is admitted to the mixing chamber, the air motor is already in operation and air is already issuing from the spray nozzle, thereby ensuring that as mixed material is admitted to the mixing chamber, the rotor will be already in operation and as material passes through the nozzle, it will find air already issuing therefrom, thereby ensuring proper mixing and spraying of the material.

It will be noted from the exploded view of FIG. 15 that the nozzle components may be readily disassembled for cleaning and that the entire nozzle assembly may be removed as a unit from the gun body by release of the thumb screws 138 and 140.

*Modified Mixer*

In FIGS. 17 and 18 a modified form of the mixer rotor is shown. In the mixing of certain two-part materials, particularly some of the foaming materials, it is necessary to ensure an intimate molecular mixing of the components. As the components frequently will tend to foam and cure within a few seconds after their mixing, it is necessary that they not remain in the mixer any longer than absolutely necessary in order to mix them together. Further, a mixer small enough to be feasible for use in a hand-held gun must be relatively small in its overall dimensions. To ensure molecular mixing of the components in a relatively small mixing area or chamber, it has been found that the rotor shown in FIGS. 17 and 18 is very satisfactory. The rotor may be disposed in the guns of FIGS. 1 and 8 in place of the rotor therein shown. In FIGS. 17 and 18 the mixing chamber has been shown in phantom outline about the rotor.

The rotor chamber, as with the chamber shown in the guns of FIGS. 1 and 8, is hollow and cylindrical and is provided with a front wall 350 and an opposed rear wall 352 between which the rotor rotates. Extending between the front and rear walls is an encircling peripheral wall 354. The rotor is provided with a shaft 356 which extends out of the mixing chamber through a supporting bearing and sealing member 358 similar to the corresponding member 230 heretofore mentioned. The shaft 356 is adapted to be coupled to the air motor of the gun at 360.

The rotor is provided with a mixing head portion 362 which may be formed of one piece of material rigidly mounted on rotor shaft 356 in any convenient fashion. The rotor head includes a plurality of radially extending fins 364, each of which has a leading edge 366 and a trailing edge 368. The marginal leading edge portion 370 of each fin is disposed in the plane of rotation of the rotor head and more closely adjacent the front wall 350 of the mixing chamber than the rear wall 352. The trailing edge 368 of each fin is disposed more closely adjacent the rear wall 352 than the front wall 350. The marginal leading edge portion 370 of each fin, at a radial line of intersection 372, merges into an angularly rearwardly extending trailing edge portion 374. Portions 370 and 374 cooperate with the rear wall 352 of the mixing chamber to form material-trapping pockets 375. These pockets tend to hold material admitted through each of the inlet ports 376 and 378 adjacent the rear wall of the chamber and prevent the material from immediately passing directly through the chamber and out through the outlet port 380.

It is desirable that the material remain in the mixing chamber as long as possible so that an intimate or molecular mixing of the material is effected, and the shape of the rotor fins forming with the rear wall the aforementioned pockets 376, tends to keep the material against the rear wall of the chamber and within the chamber for a longer period than otherwise. The pockets tend to build up a back pressure against material issuing from the inlet ports and to maintain this pressure within the mixing chamber.

Air may be admitted to the mixing chamber as described heretofore to further enhance the intimate mixing of the materials. When air is admitted both in this modified mixer and in the mixers of the guns of FIGS. 1 and 8 heretofore mentioned, the air tends to build up a back pressure within the mixing chamber preventing material from escaping as rapidly from the discharge port as it would otherwise escape were the air absent.

What is claimed is:

1. A gun for mixing and dispensing multi-component materials comprising: a gun body, a motor mounted on the body, means coupled with the motor for controlling its operation, a mixing chamber on the gun body, a mixer in the chamber coupled with the motor to be driven thereby, said chamber having a mixed material discharge opening and component material inlet openings for each component, and valve means communicating with said inlet openings and coupled with the first-mentioned means to be conjointly operated therewith for controlling the admission of components to said chamber.

2. The invention defined in claim 1 characterized in that said mixing chamber and mixer are removably mounted on the gun body with the mixer releasably coupled with the motor.

3. The invention as defined in claim 1 characterized in that said valve means are disposed at the discharge end of said inlet openings.

4. The invention as defined in claim 1 characterized in that said valve means is mounted on the gun body and said means for controlling motor operation is mounted on the gun body with both such means mechanically connected together for substantially simultaneous joint operation, and trigger means are mounted on the gun body and coupled to each such means to substantially simultaneously actuate the same.

5. The invention as defined in claim 4 characterized in that said trigger means is operative to actuate the motor control means prior to actuation of the valve means.

6. A gun for receiving under pressure a plurality of separate material components and mixing together and dispensing them as a mixture comprising, in combination: a gun body, means on the gun body for receiving and mixing together a plurality of material components, said means having a mixed material discharge outlet and a plurality of material component inlets, one for each component, valve mechanism communicating with said inlets to control the flow of components therethrough and to said mixing means, said valve mechanism including spring means biasing the valve mechanism counter component pressure to a normally closed component flow-blocking position but yieldable to a determined component pressure to allow flow of component through said inlets into the mixing means, and means on the gun body operable by the gun operator and coupled with said valve mechanism to lock the mechanism closed against component pressure or unlock the mechanism to allow the same to open when the component pressure exceeds said determined pressure.

7. The invention as defined in claim 6 characterized in that a motor is mounted on the gun body and coupled with said mixing means, motor control means are mounted on the gun body and coupled to the motor for starting and stopping it with such means also coupled to said means for locking the valve mechanism closed for substantially conjoint unlocking of the valve mechanism and starting of the motor or locking of said valve mechanism and stopping of the motor.

8. A gun for receiving under pressure a plurality of separate material components and mixing together and dispensing them as a mixture comprising, in combination: a gun body, mixing means on the body for mixing the components together, means providing a passageway for each component with each passageway discharging into said mixing means, valve means cooperating with said passageways to control component flow therethrough to the mixing means, spring means coupled with the valve means and biasing the valve means counter component pressure to a normally closed component flow blocking position and yieldable to a determined component pressure to allow flow of component through said passageways to the mixing means, and locking means on the gun body releasably coupled to said valve means to lock the latter closed against component pressure or unlock the valve means to allow the same to open when the component pressure exceeds said determined pressure.

9. The invention defined in claim 8 characterized in that said mixing means is removably mounted on the gun body and said valve means is disposed at the discharge end of said passageways.

10. The invention defined in claim 8 characterized in that powering means is mounted on the gun body and operatively coupled with said mixing means to operate the same, and control means on the gun body is coupled to said powering means to control operation thereof and coupled with said locking means.

11. In a gun for receiving under pressure a plurality of separate material components and mixing together and dispensing them as a mixture: a gun body, a motor mounted on the body, a mixing chamber assembly removably mounted on the body and including removably sealingly connected members defining a hollow mixing chamber, a mixer removably disposed in said chamber and rotatably supported by the said assembly and including a portion extending out of the chamber and releasably connected to said motor, means on said body defining a plurality of component inlet passageways disposed to discharge component into said chamber with said passageway-defining means removably sealingly engaging a wall of the chamber around such passageways to prevent unintended escape of component from the chamber, said chamber having a mixed component outlet opening, means on the gun body for controlling operation of the motor, and mechanism on the gun body coupled to such control means and including a valve for each passageway to control flow of component into the chamber.

12. In a gun for receiving under pressure a plurality of separate material components and mixing together and dispensing them as a spray: a gun body; mixing means on the body for receiving the components and mixing them together; valve means for controlling the admission of components to said mixing means; and a spray nozzle assembly on the gun body in mixed component-receiving communication with the mixing means, said assembly comprising means defining an air jet orifice, means defining a mixed component discharge orifice disposed to discharge a hollow cylinder of mixed component around an air jet issuing from the air jet orifice, means defining a second air jet orifice arranged to discharge a hollow cylinder of air around the exterior of the mixed component material issuing from the component discharge orifice, and means defining a plurality of air jet orifices arranged around the aforesaid jets of air and component material and opening in a direction to play jets of air angularly thereagainst.

13. A spray nozzle for spraying mixed multi-component materials comprising: a nozzle body, said body provided with passageways for delivering mixed new component materials and air under pressure, a first orifice-defining member removably mounted on said body with the orifice thereof communicating with the air passageway in said body and disposed to direct a jet of air outwardly away from said body, a second orifice-defining member removably mounted on said body with its orifice cooperating with the first orifice-defining member to provide an annular orifice surrounding the first orifice in coaxial relation therewith and communicating with the component delivery passageway in the body to direct a hollow cylindrical stream of mixed component outwardly away from the body in coaxial encircling relation with said air jet, a third orifice-defining member removably mounted on said body with its orifice cooperating with the second orifice-defining member to provide an annular orifice coaxial with the first and second orifices and communicating with the air delivery passageway in the nozzle body and disposed to direct a hollow cylindrical jet of air outwardly away from the body in coaxial encircling relation with the first and second jets.

14. In a gun for receiving under pressure a plurality of separate material components and mixing together and dispensing them as a mixture: a gun body, a mixing chamber on the gun body having a separate inlet for each material component to be mixed, a valve for each inlet for allowing or preventing component flow through the inlets to the chamber, an air-operated motor on the gun body, a mixer rotor in the chamber coupled to said motor, a trigger on the gun body coupled to each valve, a valve on the gun body for receiving air from a source of compressed air and delivering the air to the air motor and coupled with said trigger for opening and closing thereby, and spring bias means on the gun body coupled to said trigger to initially resist movement of the trigger in a direction opening said motor control valve with a greater resistance than the resistance to movement of the trigger thereafter.

15. A gun for receiving under pressure a plurality of separate material components and mixing together and dispensing them as a mixture comprising, in combination: a gun body, mixing means on the body for mixing the components together, means providing a passageway for each component with each passageway discharging into said mixing means, valve means cooperating with each passageway to control component flow therethrough and biased counter component pressure in each passageway to a normally closed component flow blocking position and yieldable to component pressure in the passageways exceeding by a determined amount the pressure in the mixing means to allow flow of component through the passageways to the mixing means, and locking means on the gun body coupled to the valve means to lock the latter closed against component pressure or unlock the valve means to allow the same to open when the component pressure in the passageways exceeds said determined amount.

References Cited in the file of this patent

UNITED STATES PATENTS

| | | |
|---|---|---|
| 1,400,553 | Jenks et al. | Dec. 20, 1921 |
| 2,738,230 | Pillard | Mar. 13, 1956 |
| 2,764,565 | Hoppe et al. | Sept. 25, 1956 |
| 2,788,337 | Preiswerk et al. | Apr. 9, 1957 |
| 2,847,196 | Franklin et al. | Aug. 12, 1958 |
| 2,970,773 | Keryluk et al. | Feb. 7, 1961 |
| 2,991,015 | Standlick | July 4, 1961 |